United States Patent [19]
Zimmer

[11] Patent Number: 5,157,392
[45] Date of Patent: Oct. 20, 1992

[54] TELEMETRY NETWORK FOR DOWNHOLE MULTISTATION SEISMIC RECORDING TOOLS

[75] Inventor: Mark D. Zimmer, Katy, Tex.
[73] Assignee: Halliburton Logging Services, Inc., Houston, Tex.
[21] Appl. No.: 590,843
[22] Filed: Oct. 1, 1990
[51] Int. Cl.[5] .............................................. G01V 1/00
[52] U.S. Cl. ............................. 340/853.9; 340/855.5; 340/855.6; 181/103; 367/912; 364/422; 346/33 WL
[58] Field of Search ..................... 367/65–67, 367/25, 65, 66, 911, 912; 340/853–857; 346/33 WL; 181/102–108; 364/421, 422

[56] References Cited
U.S. PATENT DOCUMENTS

| | | | |
|---|---|---|---|
| 3,315,224 | 4/1967 | Ferguson | 367/853 |
| 4,684,947 | 8/1987 | Zimmer | 340/858 |
| 4,718,011 | 1/1988 | Patterson, Jr. | 364/422 |
| 4,800,981 | 1/1989 | Uttecht et al. | 181/104 |
| 4,862,428 | 8/1989 | Cretin et al. | 367/33 |
| 4,897,646 | 1/1990 | Goodwill et al. | 340/853 |
| 4,999,817 | 3/1991 | Zimmer | 367/65 |
| 5,010,333 | 4/1991 | Gardner et al. | 340/856 |
| 5,031,719 | 7/1991 | Baria et al. | 181/122 |

Primary Examiner—Brian S. Steinberger
Attorney, Agent, or Firm—William J. Beard

[57] ABSTRACT

A seismic logging system for VSP or cross well data capture set forth. It is comprised of M duplicate recording stations connected serially below a main structure suspended on a logging cable. Each of the recording stations preferably includes orthogonally arranged displacement transducers, and they are in turn connected with suitable amplifiers, filters and converters to form digital words, and the digital words are recorded in organized fashion in a memory. A telemetry unit is connected to that memory for transfer of data. This data transfer takes place over a short distance into the main unit, and the main unit includes a much larger memory for storing and holding data from M recording stations deployed along and there below in the well borehole, and further including telemetry means for transfer of data along the logging cable. The main memory and the main telemetry means operate at different rates and different capacities; each recording station has its own memory and telemetry means to individually form data words which are first stored locally and then transferred to the main memory where upon telemetry along the logging cable subsequently occurs.

14 Claims, 1 Drawing Sheet

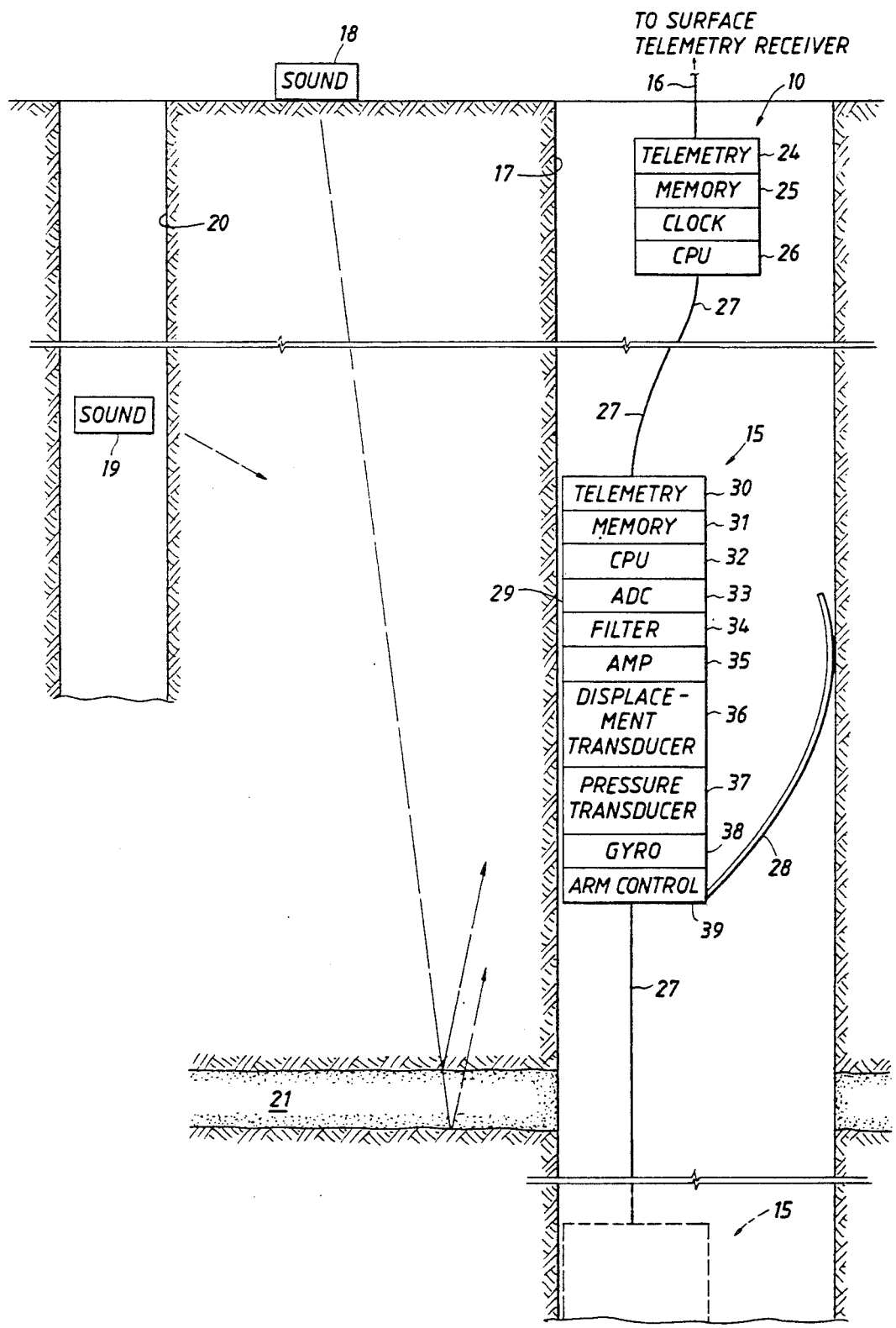

TELEMETRY NETWORK FOR DOWNHOLE MULTISTATION SEISMIC RECORDING TOOLS

BACKGROUND OF THE DISCLOSURE

The present disclosure is directed to a telemetry network and more particularly to a system used with a spread of displacement senors making up a multistation set of equipment and thereby having multiple data generators. In greater detail, this disclosure is a method and apparatus for obtaining data from multiple sensors spread along a well. It finds application both in sensors placed in a well to record VSP data and to also obtain crosswell survey data.

One known logging technique is generally identified as VSP logging and involves a process whereby a sound source such as a vibrator or explosive charge is operated from the surface, sonic shock waves are then transmitted from the surface through multiple layers of the earth's crust, and the shock waves are reflected at various interfaces. A sensor is positioned in a well near the shock source. The sonic signals travel downwardly and reflect back toward the surface where they are intercepted and data is recorded from various geophone locations along the well. A crosswell survey involves positioning a sound source in an adjacent well, perhaps spaced apart by a few hundred feet, or even a few thousand feet from a well in which a sensor is positioned.

The present disclosure is directed to a system which reduces the time necessary to obtain data. More data is obtained in a shorter interval through the present approach. This involves positioning sets of displacement transducers at selected depths. In response to a single stimulus (which can be either an explosive, or a sweep sequence of a sound generator), data can be obtained at multiple locations. One of the difficulties with this, however, is that so much data is created that it is difficult to get all of the data out of the well and to the surface. In light of that, the present disclosure sets forth a telemetry system which holds some of the data and makes delayed transmission of that data to the surface.

The present disclosure sets out clusters of displacement transducers which are arranged in mutually orthogonal directions to provide three coordinate resolution of the sonic signal of interest. This is placed in a housing supporting the three sensors for installation at a particular depth. This is replicated at selected spacings along the well, for instance separate recording stations at a spacing of twenty-five feet. If only two or three sets of equipment are included, the data obtained from simultaneous operation is substantial, but it might possibly be transmitted to the surface through a conventional telemetry system; however, when the number of recording stations increases, data recovery is markedly increased far beyond what can be handled in logging cable telemetry. The present system sets forth a telemetry mechanism which enables recovery of the data. This also provides a common bus system from the stations which are deployed or spread along the well to transmit the data from the respective sensors to a main telemetry unit, and thereafter enables transmission to the surface. At the completion of each recording cycle, the telemetry system in the main unit will interrogate each of the appended seismic recording stations and obtain the necessary data. This is sequentially carried out until all the data has been transmitted to a memory in the main unit. In an overlapping fashion or at the completion of each sonic shock wave, data is transmitted from the main unit by telemetry to the surface. This latter transmission is particularly the more difficult transmission because it normally requires transmission over a much longer cable and it is limited to a maximum data rate.

This system is particularly advantageous over competitive devices. Heretofore, twisted pairs of wires have been used to deliver data to the telemetry unit. By contrast, it is much easier to provide a localized digitizing system and make a data transfer of digital data from subordinated telemetry units to a main telemetry unit for temporary storage in memory in a larger memory, and thereafter obtain transfer from the larger memory. Accordingly, each 3-axis recording station is provided with its own self-contained data acquisition system. Each one is thus provided with an amplifier, a filter, and an analog to digital converter (ADC) which are operated under control of a central processing unit (CPU) so that data is written into a memory in an organized fashion. That memory associated with that recording station is periodically interrogated and transmission is made by the station telemetry to the main unit which is provided with a separate telemetry system and main memory. The data is temporarily written in the main memory and is transmitted by the main telemetry system through the logging cable. As will be understood, the logging cable can be several thousand feet in length, and this great length provides some limitation on the data transfer rate appropriate for operation.

The present apparatus is summarized as a replicated seismic recording station spread comprised of M (a whole number integer) stations which are identical in construction. Each station is preferably provided with multiple listening devices, typically three orthogonal displacement transducers and an omnidirectional hydrophone (pressure transducer). In addition, a gyro can be provided which provides an indication of the angular position in space of the recording station. All of this structure is installed in a single housing along with a locking arm which locks the device rigidly against the sidewall of the well borehole. When it is locked in position, it is able to receive seismic shock waves from a remote explosive or tone source generator which are transmitted through the various formations with appropriate reflections and refractions thereby providing useful data. The analog signals output by the pressure and displacement transducers in the structure are appropriately amplified, filtered, converted to digital values, all in a timed sequence and recorded in localized memory. Thereafter, a telemetry unit transmits from the localized memory to a main memory and the main memory, in conjunction with a main telemetry system, transmits data up the logging cable for recovery at the surface.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The enclosed drawing shows the telemetry system installed in a multistation transducer spread in a well borehole for recovery of analog data which is transmitted to the surface.

DETAILED DESCRIPTION OF THE PREFERRED EMBODIMENT

The present description will set out certain aspects of the context in which the equipment is used so that the demands on the system can be better understood. It will be described in conjunction with a VSP operation as well as a crosswell survey routine. The equipment will be described in a well borehole to aid and assist understanding of its operation, and then a typical sequence of operation will be given. Within that context, it is thought that the telemetry system of the present disclosure will be more readily understood. The numeral 10 identifies the main telemetry unit of the present disclosure. It operates in conjunction with a replicated seismic recording station generally indicated at 15 which is installed in the well borehole supported from the main unit 10. The string of equipment is positioned in a well supported from a logging cable 16 which is typically an armored cable wrapped with multiple layers to provide strength and protection for one or more electrical conductors within the cable 16. The conductors make up the necessary data communication pathway from the main telemetry unit 10. All of this equipment is installed in a well 17 which is shown to be an open hole but which can also be a cased well. Whether open or cased, the logging cable 16 is lowered in the well until the main unit 10 is at some depth. The replicated recording station 15 is suspended below the main unit by a specified distance. The representative distance used in this disclosure is twenty-five feet, but it will be understood that that is merely an example and that the spacing can be different. Several such units 15 are thus suspended below the main unit 10. For instance, the number of stations can be increased until the length becomes either unwieldy or the spread of recording stations is longer than is needed. A typical maximum value is about twenty-five recording stations although that is arbitrary and the total number can be increased above that number.

At the surface, a seismic signal generator is identified at 18. There is an alternate signal generator 19 which is located in the well 20 which is at some distance from the well 17. The sound generators 18 or 19 can be any type of known sound generators including a tone generator, an explosive charge which is detonated to provide a shock wave or thumping devices which impact the ground. Whatever the case, they form an acoustic wave which is transmitted into the earth. It can be an impulse as occurs with an explosive charge, or it might be a fixed or variable frequency from some low to some high frequency. Devices are known which are able to sweep from just a few hertz across some audio band, e.g., from ten to two hundred hertz. By contrast with the impulse, the signal may be a continuous wave (CW) transmission. Cross well surveys can use a variety of sources, and suggestions of sources include impulse or shock sources or sweep devices having frequency ranges up to a selected maximum such as one or two kilohertz. Whatever the circumstance, there are formations in the crust exemplified by the formation 21 having upper and lower interfaces with adjacent formations. The impulse or CW transmission of acoustic waves results in transmission of acoustic energy into the formations and the signals are ultimately directed toward the recording station 15. The signals are received at the recording station 15 and are converted into electrical signals by the pressure sensors and displacement sensors in the apparatus 15. This data is converted from analog signals into digital signals, and coupled with other information such as location of the recording station at 15, the data can be analyzed and converted to provide meaningful information regarding the formation 21 and other formations in the earth. A surface source in a VSP routine provides a small signal while crosswell transmission from the source 19 provides a larger amplitude signal at the geophone station 15. Typically, the path of travel as exemplified in the drawing from the sound source 18 is much longer; the path of travel is generally more direct from the sound source 19 as illustrated. Accordingly, it is necessary to use automatic gain control amplifiers, hereinafter AGC so that the signals can be handled even though they may vary from a few microvolts up to a few millivolts. The amplifier may also be a variable fixed gain device or perhaps an instantaneous floating point amplifier.

Going now to the apparatus, the main telemetry unit 10 is provided with a suitable telemetry transmitter 24, a fairly large memory 25, a clock and CPU 26. The clock is provided with a trigger pulse on the logging cable 16 which initiates operation as will be described. Moreover, the sequence of operation of the main unit 10 collaborating with one or more of the recording stations 15 will also be set forth. The logging cable 16 terminates at the main unit. There is a short cable 27 which extends from the main unit 10 to the first geophone station 15. This cable 27 is again duplicated below the recording station to the next station 15 therebelow. As will be appreciated, the number can be increased. It is not necessary that the main telemetry unit 10 be fixedly clamped against the sidewall of the well. It is also essential that the recording station 15 be clamped so long as displacement type listening devices are used. Station 15 thus includes an extended arm 28 which contacts the opposite wall and forces the recording station fixedly against the wall. This positions the recording station so that it is fixed and stationary during signal formation and transmission.

Within a closed housing 29, the recording station includes a telemetry unit 30 and a memory 31. The memory is organized so that it can record and store data of a specified word length, and has a specified maximum storage capacity. A representative capacity might be anywhere from 32K to 512K words. A microprocessor comprising a CPU 32 is also included. A typical CPU can be provided by an 80188 processor. There is an ADC 33 which provides digitized values from analog signals. The ADC output can range from eight bits to perhaps sixteen bits or even eighteen or twenty bits. Additional bits associated with the digitized values include the appropriate sign bits, parity bits, error check bits and addresses in memory. Again, this can be modified depending on the memory storage space available. In addition to that, there is a filter 34 which is provided with an analog signal which is filtered and then applied to the ADC 33. An AGC amplifier 35 is also included. It provides gain at an adjustable level for amplification of the signals. There are three sensors at 36 and they are arranged at respective right angles. They provide signals which are indicative to vector components of motion. That is, the sensors respond to sonic waves traveling through the earth. An omnidirectional hydrophone 37 is included and it responds to pressure waves traveling through the earth. The numeral 38 identifies a gyro which may optionally be included to provide spatial orientation in the earth. The gyro thus provides a reference so that the structure can be oriented. It is referenced to the vertical and also north. It is a source of orientation information so that adjustments in space can be made during data reduction. There is also an arm control mechanism 39 for extending the arm 28 and holding it against the opposing sidewall to lock the structure in place.

DESCRIPTION OF THE RECORDING STATION OPERATIONS

Rather than merely describing what the components in the recording station do, it is helpful to provide a sequence of operation so that the interrelationship of the components to the seismic signal can be understood. Accordingly, the recording station 15, and other stations which are identical, are each identified by a unique station number such as a serial number. That number is stored in the memory 25 so that a control signal can be transmitted to establish control over operation of the recording station 15. The CPU 26 therefore forms a control signal in accordance with a timing sequence which provides the necessary instructions for operation for the particular recording station.

Assume that the sound source 18 is operated at a particular instant. Assume further that the recording station 15 is 10,000 feet deep in the well and the horizon 21 of interest is 15,000 feet in depth. A substantial interval is required for the sonic shock wave to travel from the sound source 18 to the horizon 21 for reflection to the recording station 15. The speed of sound through the earth is fairly well known although it might vary somewhat dependent on the nature of the formations. However, it is sufficiently well known that a delay in the equipment is permitted. Thus, while the sound may be generated at a particular instant by actuation of the sound source 18, the recording station 15 is not switched on until time for its operation. If an impulse is used, it may require a few seconds, perhaps eight or ten seconds for that signal to die away and become substantially nil. If a sonic vibration generating device is used, it might be operated for a period of ten seconds (some finite interval); this would require the recording station to be operated for at least an interval of that length although the onset will be delayed to take into account the time lag in transit from the sound source 18 to the recording station 15. This can be (in one instance) a time delay of four seconds to initiate operation of the station 15; the data should be recorded perhaps five seconds longer than the duration of the pulse from the sound source 18. In another example, it might operate for fifteen seconds. During the recording interval, the data at the sensors is sampled periodically. One suitable sampling rate might be 1,000 samples per second, while another sampling rate might be a total of 2,000 samples for the entire recording sequence. The total number of samples during operation can range anywhere from perhaps 512 to 16K or more samples. These samples are taken at regularly spaced intervals such as one sample per second, four per second etc. Thus, if the sound source 18 is operated at the time $t_0$, then the main unit 10 is normally deferred in operation for the necessary transit time and then it is operated to obtain n samples where n is a whole number integer and represent the number of samples, for instance, 16K samples or perhaps 512 samples, etc. Operation is therefore initiated, the N samples are thus taken after a delay interval D where D is measured typically in seconds, even to an accuracy of millionths of a second. A prompt signal is provided from the CPU 26 at the requisite instant in time after an enable signal is provided on the conductor 16 for operation of the telemetry equipment. Operation is started in the recording station 15, and the sonic signal is received by the three displacement transducers and one pressure transducer and then an analog signal input to the amplifier 35. Recalling that the input signals can vary widely from just a few microvolts, the four analog signals are output to the variable gain amp 35, and the signals are amplified by specified gain.

The four signals are preferably handled on a multiplexed sequence. In another approach, the four signals can be provided to four dedicated ADC circuits for data conversion. The four analog signals are in sequence amplified by a specified level of gain where the gain is indicated by the AGC setting from the amplifier 35, the signals are then filtered by the filter 34 to remove frequency content above a certain frequency level, and the signal is then converted into digital form by the ADC 33. That data is stored as a particular word after transmission from the ADC into the CPU 32 and then to the memory 31. In memory, the entry comprising the data word is made up of several data which include the gain level setting, the sign, the measured variable, appropriate parity and error check bits, and other data as necessary to convey the value of this variable. Moreover, these words are written in a particular sequence from the CPU 32 into the memory 31 and are stored in a particular sequence in the memory.

A fixed protocol is established. The protocol can be exemplified by first providing the fixed data as a set of initial conditions. Items preferably included in the fixed or initial data which is stored prior to measured variable data includes at least the following. One item of fixed data is a signal from the arm control 39 which states that the arm has been fully extended, locked in position and that the recording station 15 is firmly held in place. The gyro 38 provides data indicating the position in space of the recording station, typically represented as the three resolved components of position such as angle with respect to vertical, angle with respect to a north-south axis, and angle with respect to an east-west axis. This can have the form of three numbers which identify the orientation is space. Another element of fixed data is the initial setting of the amplifier 35. Another element of fixed data is the serial number identifying the recording station 15 in particular so that the device and its data can be coordinated.

At a selected repetition rate, the four analog signals are then sampled. These values are provided from the respective analog transducers to the amplifier 35 and are filtered by the filter 34 and converted into digital values by an ADC 33. Assume, for purposes of discussion, that the samples occur at a rate to total 8,000 samples. In each sample, assume that it is helpful to obtain an indication of the analog value. The displacement sensors are organized on an XYZ system so that the variables from the three sensors are represented as x, $x_2$, ... $x_n$ where n equals the number of samples obtained in the specified interval B. The signal from the pressure is $h_i$ ... $h_n$. The sequence of data delivered for storage in the memory might well be $h_1$, $x_1$, $y_1$, $z_1$ and is repeated for $h_2$, ... etc. The data can be stored in an interlaced fashion; however, storage without interlacing has an advantage, namely, that one source only can be retrieved from memory quickly. If only the pressure data is desired, it can be retrieved easily by interrogating its assigned block of memory. Each analog signal is converted into digital form and they are then delivered to the memory 31 for storage in a particular storage sequence. It is not necessary to repeat the fixed information except once for each set of samples obtained from the input analog signals. Thus, the fixed data is determined only once and is stored in the memory 31 while the sampled data is sampled over the n samples where n typically is in the range of about 512 to about 16 K samples. It will be understood that the variables are the signals of h, x, y and z.

Recall that the present system is installed where there are multiple recording stations 15. Let the number M represent the number of stations, and of course this requires that M be a whole number positive integer. Note also that the spacing between the various stations M from the main telemetry unit 10 is quite close. If the cable 27 is only twenty-five feet in length and that is replicated for the various recording stations 15, then the total span of cable below the unit 10 is only 25 times M feet. Twenty-five stations would represent a spread of 625 feet in total cable length with the closest being only twenty-five feet below the unit 10. This short travel distance eases the telemetry requirements from the most remote of the recording stations 15 to the unit 10. Assuming that it is even longer, perhaps 1,000 feet, transmission over 1,000 feet permits a transmission rate at a specified high data transfer rate. The data transfer rate from the station 15 to the main unit 10 might readily be perhaps 256 words per second, or even more. Data transfer rates over one million bits per second or higher contemplated, again depending on word length which in turn is dependent on the precision of the ADC 33 and the number of companion bits completing a single word. This data is thus transferred from a particular station 15 after the set of data points n has been recorded in the memory 31.

In the foregoing example, assume that 2,048 samples over a specified interval of time are taken after the sound source 18 is operated. Assume further that the initial fixed data frame is transmitted into the memory 31. Assume further that 2,048 samples are taken of each of the four variables which are the pressure transducer signal and the three respective signals from the x, y and z displacement sensors. In that instance, that would provide a total of 8,192 words representing variable data and one or two one or two words of fixed information or 8,194 words. That is stored in an established sequence in the memory 31. When the CPU 26 provides a prompt signal on the conductor 27 to the geophone station 15, the 8,192 words are then transferred from the memory 31 through the cable 27, are formatted by the CPU 26, and assigned to a specified memory location in the memory 25 for storage in a desired sequence. This is done in a sequence controlled by the CPU 26 for all of the M recording stations 15 and so they in turn transmit the data for collection and storage in the memory 25. The memory 25 must be sufficiently large to store this amount of data from M stations 15.

Assume in the foregoing instance that an impulse shock wave 18 is provided and the impulse shock wave is repeated approximately twenty seconds later. The first set of data from the first impulse is recorded over a period of time (e,g., eight seconds) while the data is being created and is stored in the memories 31 of the M stations 15. Depending on the data transfer rate from the telemetry unit 30 up to the main unit 10, the M stations can be cleared of data in the several memories 31 so that all that data is written in the memory 25 to leave the memory units 31 cleared of data. At this juncture the memories 31 can be used to dynamically receive the next transaction, i.e., the following impulse from the sound source 18 and the resultant seismic waves transmitted through the formations to the M stations 15. This will then write a second set of data in the several memories 31. At and during that time, in an overlapping fashion, the memory 25 can then be cleared. The memory 25 at this instant is holding 8,194M words of data in view of the fact that the data from M stations has been written there.

The data transfer rate on the short cable 27 is quite rapid in comparison with the permitted data transfer rate up the cable 16. Perhaps some representative values will make this more clear. The transfer rate over the cable 27 even where the span of M stations is as much as 1,000 feet in length can approach about 10 megabits/second. That rate can be safely and routinely accommodated with substantially error free transmission. The data transfer rate on the cable 16 is constrained by the substantial length of the cable 16. The cable 16 can readily be as long as 25,000 feet in length to accommodate wells of great depth with substantial cable spooled on the supply drum or reel. This length limits the data transfer rate perhaps to 100 K bps. This is the transfer rate assuming a single conductor pair. Through the use of multiple conductors and multiple level telemetering schemes, the data transfer rate might be increased, perhaps to greater than 256 K bps. The CPU 26 thus prompts the memory 25 to deliver data from the memory 25 through the telemetry 24 on receiving a hand shake signal from the surface telemetry receiver indicating that it is ready. For instance, the transfer of data can be initiated at any point in time up the cable 16 so that data is delivered from the memory 25 independent of the transactions going on at the memories 31 in the respective recording stations 15. For descriptive purpose, let the symbol $B_1$ represent the batch of data from the memory 25 which derives from the first sonic transmission from the sound sources 18 or 19, and $B_2$ represents the second batch of data. For a given operation, the sound sources 18 or 19 may be operated only once or may be operated many times so that the total record is comprised of the entries $B_1$, $B_2$, . . . $B_k$ where k is a positive integer and represents the total number of cycles of operation of the sound sources.

Stacking is a technique sometimes used to improve the quality of the data. Assume that the recording station 15 is held at a specific location and that a sonic impulse from an explosive is transmitted from the sound source 18. That is recorded for an interval of T seconds to assure recording of the onset and trailing end of the signal. Typically, T is relatively short, and can be just a few seconds, typically not more than about twenty seconds. As previously mentioned, the interval of T seconds is divided by n where evenly spaced samples are taken, and the number of samples is represented by n as previously mentioned. In any event, stacking is accomplished by positioning the recording station 15 at a specified depth, operating the sound impulse device 18 and forming a first operating the sound impulse device 18 and forming a first record $B_1$ at the M recording stations 15. This data was defined as the data batch $B_1$. The foregoing is repeated without moving the sound source 18 and without moving the station 15. This is repeated until K equals perhaps four, nine or sixteen. The signals $B_1$ to $b_k$ are summed and an average is taken. More specifically, the signals average reduces the relative significance of randomly occurring noise and otherwise provides reenforcement of coherent aspects of the received signals. In stacking, it is sometimes necessary to also move the seismic sound source 18 perhaps a few feet in a tightly controlled region at the surface. This particularly enables the transmission anomalies arising at the weathered surface layer to be overcome by distributing the points of sonic impact in a cluster. If, for instance, the sound source is moved in a region defining a circle of perhaps 50 feet diameter while mapping the formation at a depth of 15,000 feet, and where the recording station 15 is 10,000 deep in the well 17, such seismic source relocation does not materially change the angle of incidence of the radiated seismic wave directed to the horizon 21.

The data transfer rates given above are examples of data transfer rates, and are not necessarily limitations on the transfer rate. This system does, however, take advantage of the fact that the data transfer rate up the cable 27 can ordinarily be much faster because the distance is quite short in comparison with the logging cable 16. In the latter instance, the transfer rate is normally much slower because precautions must be taken to assure clarity of reception at the surface. If desired, the memory 25 can be built sufficiently large that it holds several batches such as $b_1 \ldots b_k$ so that k repeated cycles of operation of the sound device 18 permits all this data to be stored in memory without partial transfer to the surface. Assume, as an example, that a stacked sequence of operation is desired, namely, where the sound source 18 operated sixteen times and the memory 25 thus holds all the data ($B_1$ through $B_{16}$). After that, it might be appropriate to reposition the entire string of equipment in the well borehole 17 to another depth. For instance, assume that the stations encompass a spread of 500 feet because M equals twenty and the geophones are spaced at twenty-five feet. The entire spread might be moved up precisely 500 feet in the well borehole and reanchored. This maneuver requires substantial time in comparison with the data transfer rate along the main logging cable 16. The telemetry 24 can make this transfer during cable movement. Then, the sensor spread in the well borehole can again be operated in the same fashion to receive seismic data in the same fashion but at a different depth.

If desired, the data can be reduced at the surface by applying several procedures. For instance, the foregoing described stacking so that the sound source 18 is operated for up to K times and the signals are then stacked. That is, for the K signals from the X sensor, the signals $x_1, x_2 \ldots x_n$ are thus recorded and averaged with the repeated recordings until the K recordings have been stacked for the X sensor and also the Y and Z sensors. Prior to stacking, it may be desirable to provide relative rotation between sensors. The data from the three sensors can be trigonometrically converted so that all sensors are brought to a common axis such as a reference vertical axis, north-south and also east-west axis. The three axis rotation of the sensor data is believed to be a known procedure. Data can be reduced by the use of various data compression components or data compression algorithms.

As a generalization, the sound source 19 is used in the same fashion as the sound source 18. Because of the differences in geometry, there are some differences in the source 19 impinges along a more direct path and therefore is normally a larger signal. It can measure in the hundreds of microvolts. By contrast, the signal from the sensors resulting from the sound source 18 can readily be in the microvolt range and require substantially more amplification by the amplifier 35. The differences in signal levels are ordinarily accommodated by changes in the gain setting of the amplifier 35.

Variations in the present equipment are generally accommodations of scale. The number of recording stations 15 can be varied as M is increased or reduced, and the spacing from station to station, while normally uniform, can be varied also. The data transfer rates on the cable 27 and 16 are likewise different maximum transfer rates so that the transmission rate on the cable 16 may well require overlapping operation of the telemetry 24 with the several telemetry units 30 in the M stations 15. Taking an overview of the installed system, one helpful benefit occurs from the use of several small structures placed in the well. If a long, integrated housing is used to support several transducers, the mechanical structure may have multiple mechanical resonant frequencies scattered above about 100 hertz. By contrast, several smaller mechanical structures which are coupled by cables are simpler in design, smaller, and hence, have much higher resonant frequencies. The resonant frequency can be as high as several hundred hertz, perhaps 1000 hertz which markedly enhances the frequency band that can be received without resonating.

While the foregoing is directed to the preferred embodiment, the scope thereof is determined by the claims which follow.

What is claimed is:

1. A method of obtaining seismic data from a remote seismic source in a well borehole wherein the method comprises:
    (a) momentarily securing in position M seismic wave sensors along a selected length of well borehole wherein each of said sensors is connected to an associated memory;
    (b) at each of said sensors, receiving and recording in the associated memory signals from the seismic sensors in response to a seismic excitation;
    (c) telemetering from the seismic sensor memories data into a main memory momentarily positioned in the well borehole in proximity of the sensors therein; and
    (d) telemetering from the main memory in the well borehole along a logging cable in the well borehole data so that the data is made available at the surface from the logging cable.

2. The method of claim 1 wherein the sensors are vertically spaced along the well borehole and each of said sensors comprises a displacement transducer.

3. The method of claim 2 wherein sensors deployed in the well borehole include at least two sensors ax right angles to each other and said sensors displacement transducers.

4. The method of claim 1 further including the step of deploying three orthogonally arranged displacement transducers at M locations along the well borehole wherein movement is stopped from before creation of a seismic excitation until after seismic excitation dies away with time.

5. The method of claim 1 further including the step of deploying three orthogonally arranged accelerometers at M loctaions along the well borehole wherein the accelerometers are held stationary with respect to the well borehole.

6. The method of claim 1 including the step of receiving a seismic signal at a sensor in the well borehole, amplifying and filtering the signal to a specified amplitude; converting the signal from analog into digital form and recording the signal in the associated memory in immediate proximity to said sensor.

7. The method of claim 1 including the step of positioning M identical recording stations along a cable for deployment in the well borehole wherein each of said M identical recording stations includes a associated memory, and further including the steps of converting seismic signals at said M stations into a recordable form for the associated memory, storing signals in the associated memory for a finite interval, and in specific sequence, making the telemetry transfer from the M recording station memories into the main memory.

8. The method of claim 1 including the step of providing a start signal to initiate recording in memory at each of said sensors wherein the seismic excitation is timed in relationship to creation of a seismic excitation signal transmitted through formations of the earth to the well borehole.

9. The method of claim 1 including the step of providing telemetry along the logging cable overlapping the transfer from the associated memories at the sensors into the main memory.

10. The method of claim 1 including the step of using a geophone for the sensor.

11. An apparatus for use in obtaining seismic data from a well borehole wherein the apparatus comprises:
 (a) a first assembly adapted to be suspended on a well logging cable and including:
  1) a main memory for storing data;
  2) a CPU for controlling receipt of data thereto and writing that data in said main memory in a timed sequence; and
  3) telemetry means for transfer of data out of the main memory and along the logging cable; and
 (b) identical transducer stations deployed at spaced locations in series from said firts assembly and each includes:
  1) sensor means for receiving a seismic wave through the earth;
  2) means for signal conditioning of the signal from said sensor means to form a signal for subsequent conversion;
  3) means for converting the signals into a recordable form;
  4) memory that means connected to said coverting means so that the signals can be momentarily stored therein;
  5) telemetry means to transfer from said memory means to said main memory; and
  6) means locking said transducer station in a well borehole for an interval.

12. The apparatus of claim 11 wherein said sensor means comprises a displacement transducer.

13. The apparatus of claim 11 wherein said sensor means comprises a geophone.

14. The apparatus of claim 11 wherein said sensor means comprises a pressure transducer.

* * * * *